Figure 1:
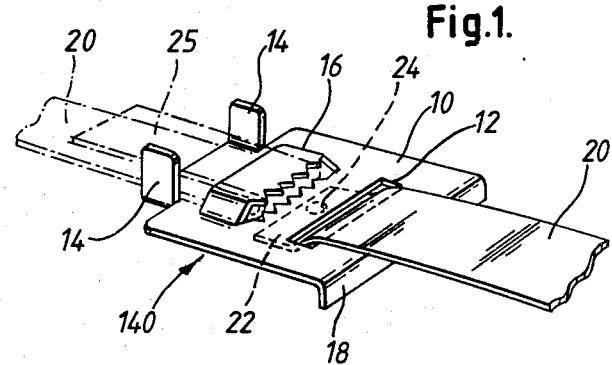

United States Patent [19]

Heard

[11] 4,366,937

[45] Jan. 4, 1983

[54] DEVICE FOR MOUNTING AN OBJECT TO A POST

[76] Inventor: Robert A. H. Heard, Church Farm, 63 Church La., Backwell, Bristol, BS19 3JJ, England

[21] Appl. No.: 148,148

[22] Filed: May 9, 1980

[30] Foreign Application Priority Data

May 10, 1979 [GB] United Kingdom ............... 7916137
Jun. 26, 1979 [GB] United Kingdom ............... 7922106

[51] Int. Cl.$^3$ ................................................ E01F 9/01
[52] U.S. Cl. ..................................................... 248/231
[58] Field of Search ................................. 248/230, 231

[56] References Cited

U.S. PATENT DOCUMENTS

| | | | |
|---|---|---|---|
| 3,012,750 | 12/1961 | Schermerhorn | 248/231 |
| 3,059,250 | 10/1962 | Mayer | 248/231 |
| 3,240,863 | 3/1966 | Brede | 248/231 X |
| 3,241,800 | 3/1966 | Richter | 248/231 X |
| 3,309,749 | 3/1967 | Gill | 24/249 |
| 3,357,265 | 12/1967 | Thompson | 74/10.33 |
| 3,458,217 | 7/1969 | Pride | 285/3 |
| 3,894,707 | 7/1975 | Heard | 248/231 |
| 4,094,487 | 6/1978 | Heard | 248/231 |
| 4,186,468 | 2/1980 | Zaniewski | 248/231 X |

FOREIGN PATENT DOCUMENTS

| | | |
|---|---|---|
| 641916 | 12/1963 | Belgium . |
| 907363 | 3/1954 | Fed. Rep. of Germany . |
| 1229904 | 12/1966 | Fed. Rep. of Germany . |
| 6810040 | 12/1968 | Fed. Rep. of Germany . |
| 6922309 | 6/1969 | Fed. Rep. of Germany . |
| 2107685 | 2/1971 | Fed. Rep. of Germany . |
| 2534822 | 2/1976 | Fed. Rep. of Germany . |
| 2389430 | 5/1977 | France . |

Primary Examiner—Louis Rimrodt
Attorney, Agent, or Firm—William R. Hinds

[57] ABSTRACT

For mounting an object to a post, a steel strap for attachment to the object and for passing around the post has a sheet steel buckle adapted to interconnect the ends of the strap and hold them around the post in a tightened condition. A length of the strap is secured at one end to the buckle, its other end being free for connection to the buckle after passing around the post. The buckle is provided with a sheet steel flange arranged so as to present a sheet steel edge inwardly to bear upon the surface of the post when the strap is tightened, to thereby resist rotational displacement of the object around the post.

4 Claims, 5 Drawing Figures

U.S. Patent     Jan. 4, 1983     4,366,937

DEVICE FOR MOUNTING AN OBJECT TO A POST

FIELD OF THE INVENTION

This invention relates to devices for mounting an object, such as a sign, to a post, especially a circular post, by means of a steel strap tightened around the post.

BACKGROUND OF THE INVENTION

Such devices are well known per se. Typically a strap attached to the object is passed around the post and tightened and the ends secured together by means of a buckle, or by a screw adjustably connecting the strap ends.

A well known form of buckle for this purpose comprises a plate having a strip cut and pressed out of its central region providing a bridge around which one end of the strap can pass, and leaving a slot through which the other end of the strap passes, the end of the strap taken around the bridge being then retained by pressing down onto it a pair of ears upstanding from the plate at one end. Examples of such buckles are sold under the Trade Marks "Tespa" and "Band-it".

One problem associated with fixing signs to circular posts is that the sign can sometimes be shifted angularly around the post, e.g. by the action of wind or other pressure. To combat this it has been proposed to provide the strap with inwardly projecting depressions in the strap material which, in the case of a plastics coated steel pole, press into the plastics coating and resist displacement around the pole.

SUMMARY OF THE INVENTION

The present invention is based on the discovery that a simple and better angular securing, applicable also to hard surface posts, can be obtained by a flange portion of the buckle which presents a sheet steel edge to the surface of the post, which edge is pressed against the surface of the post when the strap is tightened.

BRIEF DESCRIPTION OF THE DRAWINGS AND DESCRIPTION OF PREFERRED EMBODIMENTS

Figure 2:
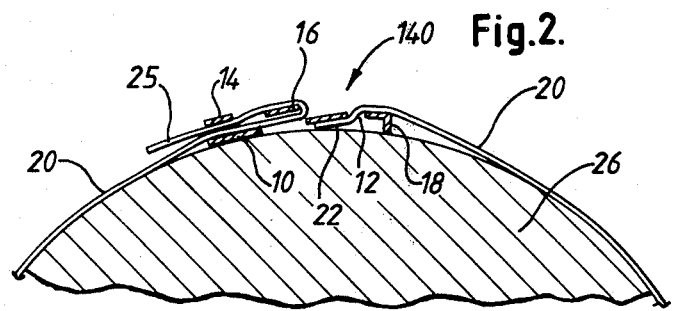
Figure 3:
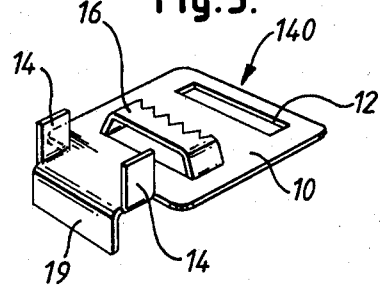
Figure 4:
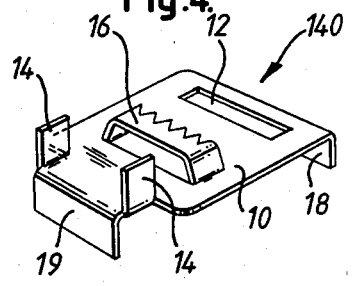
Figure 5:
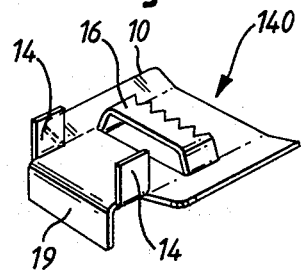

Various embodiments of the invention will now be described with reference to the accompanying drawings, wherein:

FIG. 1 shows a perspective view of a first embodiment of buckle and strap,

FIG. 2 shows a cross-sectional side view through the buckle in use securing the strap around a post, FIGS. 3, 4 and 5 show perspective views of alternative embodiments of buckle, Referring to the drawings, and firstly to FIG. 1; the buckle 140 is suitably stamped from stainless steel sheet, and comprises a generally rectangular plate 10 having a transverse slot 12 near one end and formed with a pair of out-turned ears 14 at the other end. Between the slot and the ears a transverse strip 16 of the plate is cut and pressed out of the plane of the plate in the same direction as the ears 14 to provide a bridge element. The end of the plate adjacent the slot 12 is turned downwardly in the direction opposite to the ears 14 to provide a flange 18. The flexible stainless steel strap 20 is cranked at one end 22 and engaged in the slot 12 and secured by a spot weld 24.

In use, referring to FIG. 2, the strap is passed around a post 26, and the free end of the strap is passed over the plate 10 between the ears 14, threaded through the gap between the bridge strip 16 and the plate, and after tightening the strap the end portion 25 is turned back over the bridge piece 16 and between the ears 14. The ears are then pressed down, for example using a hammer, to grip the end portion 25 of the strap. As can be seen from FIG. 2, the flange 18 of the buckle bears upon the surface of the post 26, and is pressed against it by the tightening of the strap. This helps to resist rotation of the strap and buckle around the post, particularly if the post is provided with a plastics exterior surface, as is often the case.

FIG. 3 shows a buckle 140 similar to that of FIG. 1, except that instead of a flange 18 at the end adjacent the slot 12, a flange 19 is provided at the other end adjacent the ears 14. The rib similarly bears against the surface of the post when the strap is tightened.

FIG. 4 shows a buckle, similar to that of FIG. 3, except that flanges 18,19 are provided at both ends of the plate.

FIG. 5 shows a buckle similar to that of FIG. 3, except that the slot 12 is omitted. In this embodiment, the end of the strap which would otherwise have been engaged in the slot 12 is passed through the slot left by the bridge strip 16, and can either be cranked and spot-welded to the underside of the plate in the region of the ears 14, or can be turned back underneath the plate to be welded to the underside of the plate at the end remote from the ears 14, or welded to itself beyond the buckle. This embodiment could additionally or alternatively have a rib 18 at the end opposite to the ears 14, as with the embodiment of FIG. 1 or FIG. 4.

I claim:

1. An improved device for mounting an object to a post, in which a steel strap for attachment to the object and for passing around a post has a sheet steel buckle adapted to interconnect the ends of the strap and hold them around the post in a tightened condition, where the improvement comprises a unitary steel strap of predetermined fixed length secured at one end to the buckle, its other end being free for connection to the buckle after passing it around the post, the buckle comprising a unitary stamped body and being provided with a sheet steel flange bent out of the plane of the buckle and arranged so as to present a sheet steel edge inwardly to bear upon the surface of the post when the strap is tightened, whereby said flange edge is pressed against the post by tightening of the strap, so as to resist rotation of the strap and buckle around the post.

2. A device according to claim 1 wherein the buckle comprises a sheet steel plate having a strip cut and pressed out of its central region to provide a bridge around which said other end of the strap can pass, and leaving a slot beneath the bridge through which the said one end of the strap passes, and at least one ear originally upstanding from the plate at one end so that it can be pressed down onto said other end of the strap taken around the bridge to retain it, said flange being provided at the end of the plate adjacent the ear or at the opposite end.

3. A device according to claim 1 wherein the buckle comprises a sheet steel plate having a strip cut and pressed out of its central region to provide a bridge around which said other end of the strap can pass, and a slot through which the said one end of the strap passes, and at least one ear originally upstanding from the plate at one end so that it can be pressed down onto said other end of the strap taken around the bridge to retain it, said flange being provided at the end of the plate adjacent the ear or at the opposite end.

4. A device according to claim 3 wherein said one end of the strap is passed through the slot and spot welded to the underside of the plate.

* * * * *